United States Patent [19]
Andrist et al.

[11] 3,892,385
[45] July 1, 1975

[54] AUTOMOTIVE TOOL

[75] Inventors: Willard L. Andrist; Richard T. Anderson, both of Owatonna, Minn.

[73] Assignee: Owatonna Tool Company, Owatonna, Minn.

[22] Filed: May 17, 1974

[21] Appl. No.: 470,987

[52] U.S. Cl. .................... 254/133 R; 214/1 D
[51] Int. Cl. ................................ B66f 7/10
[58] Field of Search .......... 294/67 R, 67 A, 67 AB, 294/81 R, 82 AH; 214/1 A, 1 D, 86 A; 254/2 R, 2 B, 2 C, 133 R, 134; 269/17, 216

[56] References Cited
UNITED STATES PATENTS

| 2,536,550 | 1/1951 | Hughes | 254/133 R |
| 3,030,103 | 4/1962 | Allen et al. | 254/2 B X |
| 3,220,565 | 11/1965 | Wells | 214/1 D |
| 3,338,556 | 8/1967 | Sluse | 254/134 |

*Primary Examiner*—Richard A. Schacher
*Assistant Examiner*—Johnny D. Cherry
*Attorney, Agent, or Firm*—Wegner, Stellman, McCord, Wiles & Wood

[57] ABSTRACT

An automotive tool attachable to a service floor jack and having adjustable structure for engaging a top and bottom of a removable auto part, such as a door or bumper, for support of the automobile part during removal from the automobile and with the tool including removable structure including a tote handle to facilitate carrying of a removed part of the automobile.

2 Claims, 6 Drawing Figures

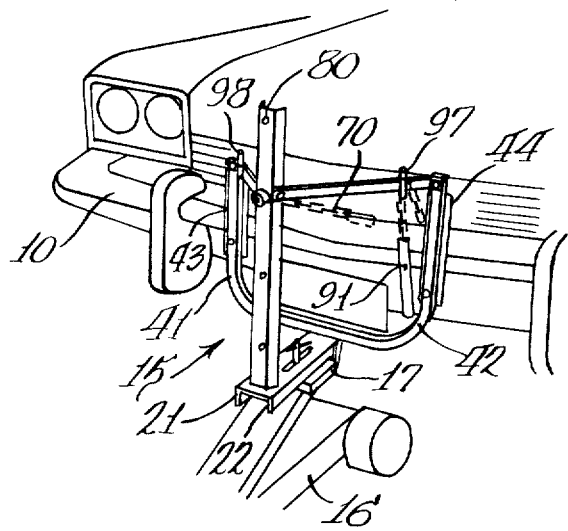
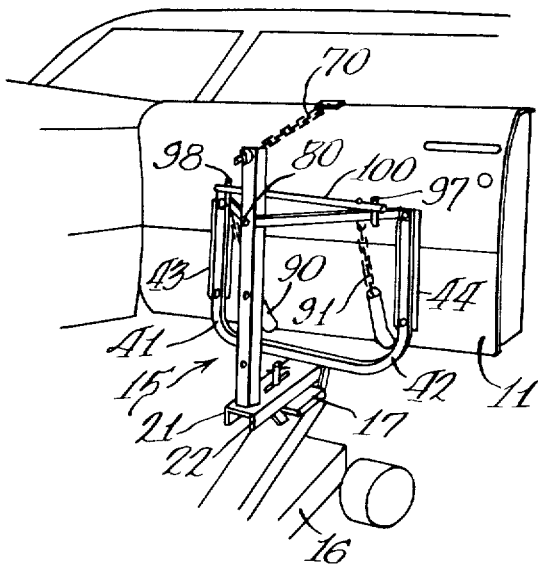
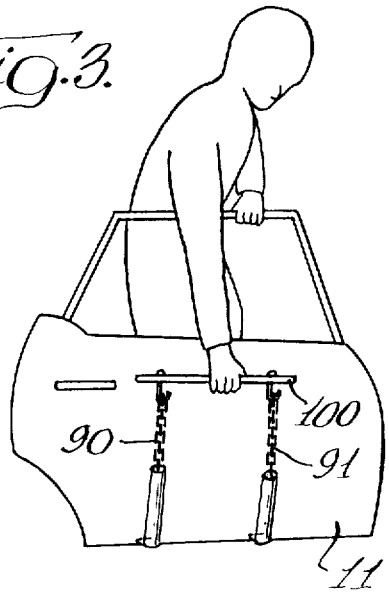

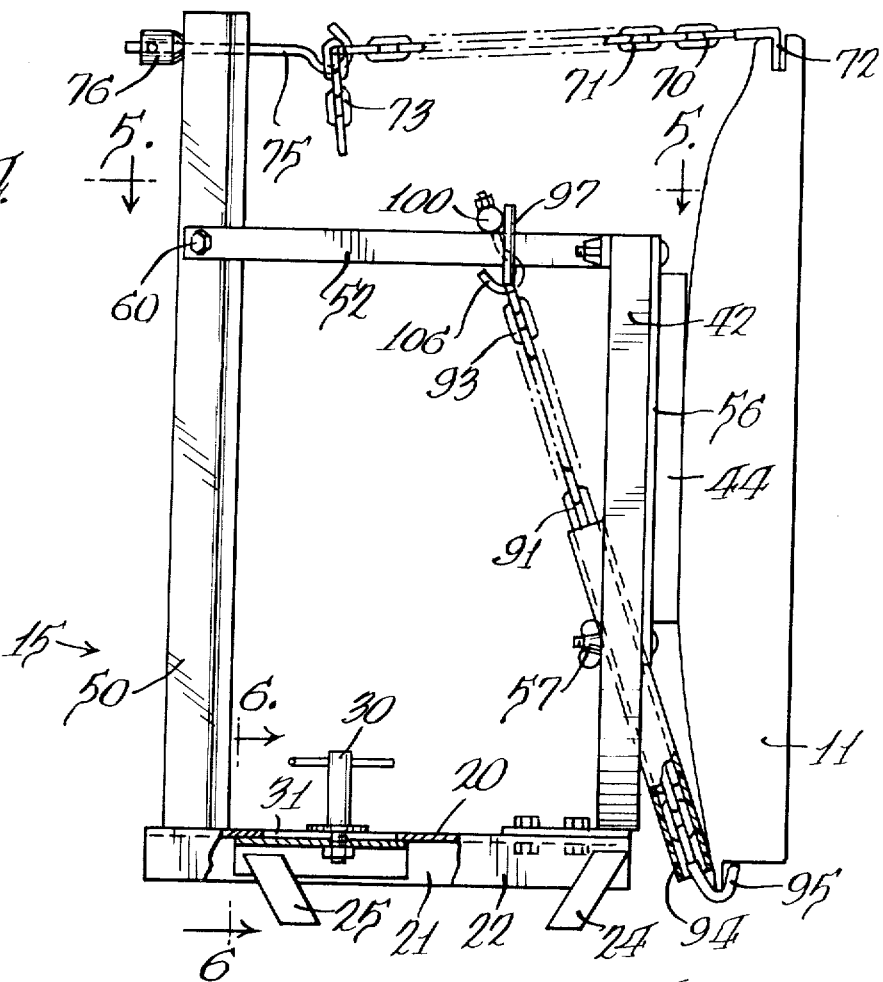
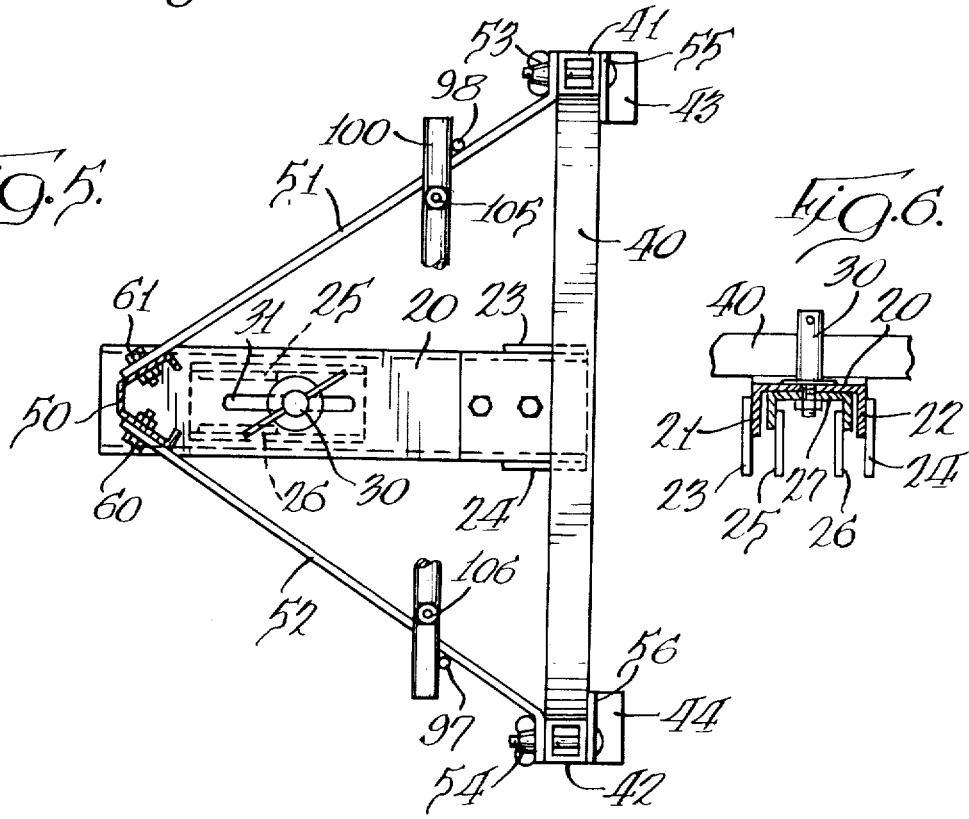

AUTOMOTIVE TOOL

BACKGROUND OF THE INVENTION

This invention pertains to an automotive tool and, more particularly, to a tool mountable on a service floor jack and provided with adjustable structure for holding an automobile door or bumper during removal and installation thereof. The prior art includes Wells U.S. Pat. No. 3,220,565 which discloses a tool mountable on a service floor jack for holding an automobile bumper. This tool has no provision for holding other automobile parts, such as a door, and is not capable of handling all types of automobile bumpers.

The Allen, et al., U.S. Pat. No. 3,030,103 discloses a tool having its own jack structure for holding automobile parts, such as doors and bumpers; however, the structure in this patent operates to support the door with the inside of the door positioned next to the tool which prevents access to the mechanism within the door interior.

the Harmon U.S. Pat. No. 2,571,572 discloses a portable tool for removing and installing springs. However, there is no disclosure in this patent of structure for handling doors and bumpers of an automobile.

A major automobile company has done work on an automotive tool for holding a door or bumper which can be mounted on a service floor jack. This tool had a frame with plural connectors positionable to engage the top and bottom of a bumper or door. This tool did not have a frame structure with angularly-related parts to permit entry of a pointed bumper within the interior of the frame nor an optionally-usable tote handle which could be removed from the tool to facilitate carrying of a door.

SUMMARY

A primary feature of this invention is to provide an automotive repair tool facilitating easy removal and installation of automotive parts, such as doors, bumpers, and tail gates which may be simply attached to a service floor jack in order to render the tool portable and which has attaching structure adjustably supported for engaging a door or bumper firmly against cushioned abutments without damage to the finish of a door and with part of the attachment structure being readily removable from the tool to form a tote handle facilitating carrying of a door.

As part of the invention disclosed herein, the tool has a base with spaced vertical legs of a first frame section carrying cushioning abutments for engagement against the automobile part and with a space therebetween permitting inward extension of a pointed bumper.

A further feature of the invention is in the optional mounting of a pair of the connectors of the tool whereby said connectors may be fastened to a tote handle which is held in a position in the tool during insertion and removal of a door and which may be lifted off the tool along with the door to facilitate easy carrying of the door.

BRIEF DESCRIPTION OF THE DRAWINGS

FIG. 1 is a perspective view of the tool shown in use in association with an automobile bumper;

FIG. 2 is a view, similar to FIG. 1, showing the tool in use in association with an automobile door;

FIG. 3 is an elevational view showing use of the tote handle to assist in carrying a door;

FIG. 4 is a side elevational view of the tool shown in use with a door and with parts broken away;

FIG. 5 is a plan section of the tool, taken generally along the line 5—5 in FIG. 4 and with the door omitted; and FIG. 6 is a vertical section, taken generally along the line 6—6 in FIG. 4.

DESCRIPTION OF THE PREFERRED EMBODIMENT

The automotive tool is shown generally in two of its uses in FIGS. 1 and 2, respectively, wherein, in FIG. 1, the tool is associated with a bumper 10 of a vehicle. In FIG. 2, the tool is associated with a door 11 of a vehicle, with the door being shown removed from the vehicle.

The tool, indicated generally at 15, is mounted to a service floor jack 16 having a lift plate 17. The tool has a base 20 with a pair of spaced, depending flanges 21 and 22 which carry a first pair of catch members 23 and 24 which angle downwardly from one end of the base to engage against an edge of the lift plate 17. A second pair of catch members 25 and 26 is secured to a U-shaped member 27 movable in the space between the depending flanges 21 and 22 for adjustment lengthwise of the base 20. A tightening mechanism 30 extends through a slot 31 in the base 20 whereby the member 27 may be held in an adjusted position lengthwise of the base. The catch members 25 and 26 engage a side of the lift plate opposite from that engaged by the catch members 23 and 24 to secure the tool to the floor jack.

The tool has a first frame section in the form of an upwardly-open, U-shape member 40 secured at its bottom to the base 20 and having a pair of spaced vertically-extending legs 41 and 42, each of which carry a cushioning abutment 43, 44 of suitable material. As shown in FIGS. 1 and 2, the cushioning abutments 43 and 44 engage against a surface of the bumper or door, respectively, to provide a nonmarring surface for engagement with the automobile part.

A column 50 extends upwardly from an opposite end of the base 20 to be positioned rearwardly of the first frame section and is rigidly supported with respect to the base and the first frame section by a pair of members in the form of straps 51 and 52. The straps 51 and 52 extend from the upper end of the legs 41 and 42 to engage the column beneath the upper end thereof. These straps are attached to the upper ends of the legs 41 and 42 by attaching bolt structure 53 and 54, respectively, which also hold mounting plates 55 and 56 for the cushioning abutments 43 and 44. The mounting plates are also secured by lower attaching bolts, one of which is shown at 57 in FIG. 4. The column 50 and the straps 51 and 52 are secured together by bolts 60 and 61. The arrangement of the straps 51 and 52 at an acute angle as well as the space between the legs 41 and 42 of the first frame section permits a relatively deep penetration of a pointed bumper into the tool.

A first connector 70 in the form of a link chain with a protective covering 71 extends from the column 50 to engage with the top of a window opening in a door or the top of a bumper. When extending into engagement with a door, as shown in FIGS. 2 and 4, a clip 72, at one end of the chain 70, fits into the window slot of the door. When the first connector extends to the top of a bumper, the connector may be reversed and a hook 73 used to engage the top of the bumper. The first connector is adjustable by the selection of the particular chain link which is to engage on a hook 75 carried by the column and, additionally, an adjustment can be made by rotation of a nut 76 threaded onto the hook 75. The height of the first connector is variable, as shown by the different positions thereof in FIGS. 1 and 2, by the column 50 having a series of vertically-spaced openings 80 to receive a stem of the hook 75.

The tool additionally includes second and third connectors 90, 91 extendable to the bottom of a door or bumper with each of these connectors being of the same construction and shown in detail in FIG. 4. As shown with respect to connector 91 in FIG. 4, the connector has a length of link chain 93 having protective tubing 94 thereon which engages the lower surface of the door to prevent marring of the finish. An end of the chain has a hook 95 to engage under the door and which is covered with a plastisol to also aid in protecting the door finish.

In use of the tool, normally the automobile part will be retained with the tool until it is replaced on the automobile. In those instances, the second and third connectors 90 and 91 extend upwardly from the lower edge of the automobile part and each has a link of the chain thereof fitted onto a pair of pins 97 and 98, respectively, which extend upwardly above and are secured to the straps 52, 51, respectively. This attachment of the second and third connectors is shown in FIG. 1. The second and third connectors are inherently adjustable, as to length, by selection of the particular chain link which will mount onto one of the pins 97, 98. As seen particularly, in FIG. 4, these pins are set back from the front of the tool a sufficient distance whereby the second and third connectors have an angle downwardly toward the lower end of the automobile part.

Particularly with respect to an automobile door, if it is desired to move the door away from the tool, a tote handle 100 may be used. As shown in FIG. 3, a tote handle 100 has the connectors 90 and 91 depending therefrom and engaged beneath the door. The tote handle 100 is positioned across the straps 51 and 52 and is held in engagement with the rear edge of the upstanding pins 97 and 98 by the forces resulting from the angular disposition of the second and third connectors 90 and 91. The tote handle 100 has a pair of spaced-apart hooks 105 and 106 which depend therefrom and which receive a link of the chain of the connectors 90 and 91 for securing the tote handle to the connectors.

With the structure as disclosed herein, the tool may be mounted to a floor jack when it is to be used and the first connector 70 is placed at the desired elevation on the column 50 by selection of the desired opening 80 along the length thereof. Additionally, the direction of mounting of the connector 70 is determined depending upon whether a door or bumper is to be held by the tool. If portability of a part removed by the tool is desired, the tote handle 100 can then be placed in supporting relation across the straps 51 and 52 and the connectors 90 and 91 extended from the hooks 105 and 106 of the tote handle. The lengths of the three connectors are basically determined by the particular chain link which is associated with the attachment hook and with additional adjustment being provided by the nut 76 associated with the hook 75 for the first connector. After a door has been removed, the upper connector 70 can be released from the door and a person may then lift the door by use of the tote handle 100, as shown in FIG. 3.

We claim:

1. An automotive tool for holding automobile bumpers, doors and the like for removal from the automobile comprising, a frame having a base supportable on the lift plate of a service floor jack, an upwardly open generally U-shape first frame section extending upwardly from the base and having a pair of spaced vertically-extending legs, a cushioning abutment fixed to the front of each leg, a column extending up from the base and located rearwardly of said first frame section, a pair of members connected between the upper ends of said legs and said column and defining an acute angle therebetween, a first adjustable connector fastened to said column, said first connector being extendable to the top of a door or a bumper, a pair of pins extending upwardly one from each of said pair of members at a distance behind said first frame section, and second and third adjustable connectors held in position by said pins and extendable downwardly at an angle to the bottom of a bumper or a door.

2. An automotive tool as defined in claim 1 wherein said second and third adjustable connectors each include a length of chain, a tote handle, and said lengths of chain are fastened to the tote handle overlying said pair of members and engaging said pair of pins to hold said tote handle from movement resulting from a pull of an automotive part and with said tote handle being manually engageable to lift the tote handle and an automotive part to facilitate carrying thereof.

* * * * *